(12) United States Patent
Bergman et al.

(10) Patent No.: US 8,950,687 B2
(45) Date of Patent: Feb. 10, 2015

(54) REMOTE CONTROL OF AN HVAC SYSTEM THAT USES A COMMON TEMPERATURE SETPOINT FOR BOTH HEAT AND COOL MODES

(75) Inventors: Gabriel Albert Bergman, Minneapolis, MN (US); Chris Mullarkey, St. Louis Park, MN (US); Cary Leen, Hammond, WI (US); David Schultz, Savage, MN (US); Milos Cabel, Brno (CZ)

(73) Assignee: Honeywell International Inc., Morristown, NJ (US)

( * ) Notice: Subject to any disclaimer, the term of this patent is extended or adjusted under 35 U.S.C. 154(b) by 1127 days.

(21) Appl. No.: 12/886,925

(22) Filed: Sep. 21, 2010

(65) Prior Publication Data

US 2012/0067561 A1    Mar. 22, 2012

(51) Int. Cl.
*F24F 11/02* (2006.01)
*G05D 23/19* (2006.01)
(Continued)

(52) U.S. Cl.
CPC ........ *G05D 23/1905* (2013.01); *B60H 1/00657* (2013.01); *F24F 11/0009* (2013.01);
(Continued)

(58) Field of Classification Search
USPC ................ 236/49.3, 51, 46 R, 1 C; 165/209, 165/237–239
See application file for complete search history.

(56) References Cited

U.S. PATENT DOCUMENTS 4,079,366 A   3/1978 Wong
4,174,807 A   11/1979 Smith et al.
(Continued)

FOREIGN PATENT DOCUMENTS

CA   2615065   7/2011
DE   3334 1176   4/1985
(Continued)

OTHER PUBLICATIONS

Honeywell, "Excel Building Supervisor-Integrated R7044 and FS90 Ver. 2.0," Operator Manual, 70 pages, Apr. 1995.
(Continued)

*Primary Examiner* — John Ford
(74) *Attorney, Agent, or Firm* — Seager Tufte & Wickhem LLC

(57) ABSTRACT

An HVAC system includes an HVAC unit having a cooling mode and a heating mode for conditioning the air in an inside space, and a programmable thermostat located remotely from the HVAC unit. The HVAC unit may have an onboard controller configured to control when the HVAC unit is in the cooling mode or heating mode, and whether the HVAC unit is activated or not. In some cases, the onboard controller of the HVAC unit may use a common temperature setpoint when controlling in the cooling mode and the heating mode. The programmable thermostat may have a programmable schedule with a plurality of time periods, where each time period has a heating setpoint and a cooling setpoint separated by a dead band. The onboard controller of the HVAC unit may be configured to accept input signals from the remotely located thermostat. The remotely located thermostat may send one or more input signals to the onboard controller of the HVAC unit in accordance with the programmable schedule, where the one or more input signals cause the onboard controller of the HVAC unit to set the HVAC unit to a particular one of the cooling mode and the heating mode, and to activate the HVAC unit so as to condition the air in the inside space in the particular one of the cooling mode and the heating mode.

8 Claims, 10 Drawing Sheets

(51) Int. Cl.
*B60H 1/00* (2006.01)
*F24F 11/00* (2006.01)

(52) U.S. Cl.
CPC .. *G05D23/1904* (2013.01); *B60H 2001/00992* (2013.01); *F24F 11/0012* (2013.01); *F24F 2011/0064* (2013.01); *F24F 2011/0068* (2013.01)
USPC .......... 236/51; 236/1 C; 236/46 R; 236/49.3; 165/209; 165/237; 165/238; 165/239

(56) References Cited

U.S. PATENT DOCUMENTS

| | | | |
|---|---|---|---|
| 4,206,872 | A | 6/1980 | Levine |
| 4,224,615 | A | 9/1980 | Penz |
| 4,264,034 | A | 4/1981 | Hyltin et al. |
| 4,296,334 | A | 10/1981 | Wong et al. |
| 4,298,946 | A | 11/1981 | Hartsell et al. |
| 4,308,991 | A | 1/1982 | Peinetti et al. |
| 4,332,352 | A | 6/1982 | Jaeger |
| 4,337,822 | A | 7/1982 | Hyltin et al. |
| 4,337,893 | A | 7/1982 | Flanders et al. |
| 4,373,664 | A | 2/1983 | Barker et al. |
| 4,379,483 | A | 4/1983 | Farley |
| 4,382,544 | A | 5/1983 | Stewart |
| 4,386,649 | A | 6/1983 | Hines et al. |
| 4,388,692 | A | 6/1983 | Jones et al. |
| 4,431,134 | A | 2/1984 | Hendricks et al. |
| 4,442,972 | A | 4/1984 | Sahay et al. |
| 4,446,913 | A | 5/1984 | Krocker |
| 4,479,604 | A | 10/1984 | Didner |
| 4,506,827 | A | 3/1985 | Jamieson et al. |
| 4,556,169 | A | 12/1985 | Zervos |
| 4,606,401 | A | 8/1986 | Levine et al. |
| 4,621,336 | A | 11/1986 | Brown |
| 4,622,544 | A | 11/1986 | Bially et al. |
| 4,628,201 | A | 12/1986 | Schmitt |
| 4,646,964 | A | 3/1987 | Parker et al. |
| 4,673,028 | A | 6/1987 | Meland |
| 4,717,333 | A | 1/1988 | Carignan |
| 4,725,001 | A | 2/1988 | Carney et al. |
| 4,837,731 | A | 6/1989 | Levine et al. |
| 4,881,686 | A | 11/1989 | Mehta |
| 4,918,439 | A | 4/1990 | Wozniak et al. |
| 4,948,040 | A | 8/1990 | Kobayashi et al. |
| 4,992,779 | A | 2/1991 | Sugino et al. |
| 4,997,029 | A | 3/1991 | Otsuka et al. |
| 5,005,365 | A | 4/1991 | Lynch |
| 5,012,973 | A | 5/1991 | Dick et al. |
| 5,038,851 | A | 8/1991 | Metha |
| 5,053,752 | A | 10/1991 | Epstein et al. |
| 5,065,813 | A | 11/1991 | Berkeley et al. |
| 5,086,385 | A | 2/1992 | Launey et al. |
| 5,088,645 | A | 2/1992 | Bell |
| 5,140,310 | A | 8/1992 | DeLuca et al. |
| 5,161,606 | A | 11/1992 | Berkeley et al. |
| 5,170,935 | A | 12/1992 | Federspiel et al. |
| 5,172,565 | A | 12/1992 | Wruck et al. |
| 5,181,653 | A | 1/1993 | Foster et al. |
| 5,230,482 | A | 7/1993 | Ratz et al. |
| 5,238,184 | A | 8/1993 | Adams |
| 5,251,813 | A | 10/1993 | Kniepkamp |
| 5,259,445 | A | 11/1993 | Pratt et al. |
| 5,329,991 | A | 7/1994 | Metha et al. |
| 5,348,078 | A | 9/1994 | Dushane et al. |
| 5,386,577 | A | 1/1995 | Zenda |
| 5,404,934 | A | 4/1995 | Carlson et al. |
| 5,482,209 | A | 1/1996 | Cochran et al. |
| 5,526,422 | A | 6/1996 | Keen |
| 5,537,106 | A | 7/1996 | Mitcuhashi |
| 5,566,879 | A | 10/1996 | Longtin |
| 5,570,837 | A | 11/1996 | Brown et al. |
| 5,673,850 | A | 10/1997 | Uptegraph |
| 5,682,206 | A | 10/1997 | Wehmeyer et al. |
| 5,732,691 | A | 3/1998 | Maiello et al. |
| 5,782,296 | A | 7/1998 | Metha |
| 5,818,428 | A | 10/1998 | Eisenbrandt et al. |
| 5,873,519 | A | 2/1999 | Beilfuss |
| 5,886,697 | A | 3/1999 | Naughton et al. |
| 5,901,183 | A | 5/1999 | Garin |
| 5,902,183 | A | 5/1999 | D'Souza |
| 5,915,473 | A | 6/1999 | Ganesh et al. |
| 5,937,942 | A | 8/1999 | Bias et al. |
| 5,947,372 | A | 9/1999 | Tiernan |
| 5,950,709 | A | 9/1999 | Krueger et al. |
| 6,020,881 | A | 2/2000 | Naughton et al. |
| 6,032,867 | A | 3/2000 | Dushane et al. |
| 6,059,195 | A | 5/2000 | Adams et al. |
| 6,081,197 | A | 6/2000 | Garrick et al. |
| 6,101,824 | A | 8/2000 | Meyer et al. |
| 6,104,963 | A | 8/2000 | Cebasek et al. |
| 6,119,125 | A | 9/2000 | Gloudeman et al. |
| 6,121,875 | A | 9/2000 | Hamm et al. |
| 6,140,987 | A | 10/2000 | Stein et al. |
| 6,141,595 | A | 10/2000 | Gloudeman et al. |
| 6,149,065 | A | 11/2000 | White et al. |
| 6,154,681 | A | 11/2000 | Drees et al. |
| 6,167,316 | A | 12/2000 | Gloudeman et al. |
| 6,192,282 | B1 | 2/2001 | Smith et al. |
| 6,196,467 | B1 | 3/2001 | Dushane et al. |
| 6,208,331 | B1 | 3/2001 | Singh et al. |
| 6,216,956 | B1 | 4/2001 | Ehlers et al. |
| 6,236,326 | B1 | 5/2001 | Murphy |
| 6,285,912 | B1 | 9/2001 | Ellison et al. |
| 6,290,140 | B1 | 9/2001 | Pesko et al. |
| 6,315,211 | B1 | 11/2001 | Sartain et al. |
| 6,318,639 | B1 | 11/2001 | Toth |
| 6,330,806 | B1 | 12/2001 | Beaverson et al. |
| 6,344,861 | B1 | 2/2002 | Naughton et al. |
| 6,351,693 | B1 | 2/2002 | Monie et al. |
| 6,398,118 | B1 | 6/2002 | Rosen et al. |
| 6,453,687 | B2 | 9/2002 | Sharood et al. |
| 6,466,132 | B1 | 10/2002 | Caronna et al. |
| 6,478,084 | B1 | 11/2002 | Kumar et al. |
| 6,478,233 | B1 | 11/2002 | Shah |
| 6,502,758 | B2 | 1/2003 | Cottrell |
| 6,518,953 | B1 | 2/2003 | Armstrong |
| 6,518,957 | B1 | 2/2003 | Lehtinen et al. |
| 6,546,419 | B1 | 4/2003 | Humpleman et al. |
| 6,556,899 | B1 | 4/2003 | Harvey et al. |
| 6,578,770 | B1 | 6/2003 | Rosen |
| 6,580,950 | B1 | 6/2003 | Johnson et al. |
| 6,581,846 | B1 | 6/2003 | Rosen |
| 6,595,430 | B1 | 7/2003 | Shah |
| 6,608,560 | B2 | 8/2003 | Abrams |
| 6,619,555 | B2 | 9/2003 | Rosen |
| 6,621,507 | B1 | 9/2003 | Shah |
| 6,726,112 | B1 | 4/2004 | Ho |
| 6,786,421 | B2 | 9/2004 | Rosen |
| 6,789,739 | B2 | 9/2004 | Rosen |
| 6,868,293 | B1 | 3/2005 | Schurr et al. |
| 7,050,026 | B1 | 5/2006 | Rosen |
| 7,152,806 | B1 | 12/2006 | Rosen |
| 7,156,318 | B1 | 1/2007 | Rosen |
| 7,302,642 | B2 | 11/2007 | Smith et al. |
| 2001/0029585 | A1 | 10/2001 | Simon et al. |
| 2001/0042684 | A1 | 11/2001 | Essalik et al. |
| 2001/0052459 | A1 | 12/2001 | Essalik et al. |
| 2002/0005435 | A1 | 1/2002 | Cottrell |
| 2002/0011923 | A1 | 1/2002 | Cunningham et al. |
| 2002/0022991 | A1 | 2/2002 | Sharood et al. |
| 2002/0060701 | A1 | 5/2002 | Naughton et al. |
| 2002/0092779 | A1 | 7/2002 | Essalik et al. |
| 2002/0096572 | A1 | 7/2002 | Chene et al. |
| 2002/0138184 | A1 | 9/2002 | Kipersztok et al. |
| 2002/0173929 | A1 | 11/2002 | Seigel |
| 2003/0000692 | A1 | 1/2003 | Okano et al. |
| 2003/0014179 | A1 | 1/2003 | Szukala et al. |
| 2003/0033156 | A1 | 2/2003 | McCall |
| 2003/0033230 | A1 | 2/2003 | McCall |
| 2003/0034897 | A1 | 2/2003 | Shamoon et al. |
| 2003/0034898 | A1 | 2/2003 | Shamoon et al. |
| 2003/0074489 | A1 | 4/2003 | Steger et al. |
| 2003/0121652 | A1 | 7/2003 | Carey et al. |

(56) References Cited

U.S. PATENT DOCUMENTS

| | | | |
|---|---|---|---|
| 2003/0123224 A1 | 7/2003 | LaCroix et al. | |
| 2003/0136135 A1 | 7/2003 | Kim et al. | |
| 2003/0142121 A1 | 7/2003 | Rosen | |
| 2003/0150926 A1 | 8/2003 | Rosen | |
| 2003/0150927 A1 | 8/2003 | Rosen | |
| 2004/0074978 A1 | 4/2004 | Rosen | |
| 2004/0262410 A1 | 12/2004 | Hull | |
| 2006/0192021 A1 | 8/2006 | Schultz et al. | |
| 2008/0295030 A1* | 11/2008 | Laberge et al. | 715/831 |
| 2009/0140058 A1* | 6/2009 | Koster et al. | 236/49.3 |
| 2009/0140059 A1* | 6/2009 | Barton et al. | 236/51 |
| 2009/0140060 A1* | 6/2009 | Stoner et al. | 236/51 |

FOREIGN PATENT DOCUMENTS

| | | | |
|---|---|---|---|
| EP | 0070414 | | 1/1983 |
| EP | 0678204 | | 3/2000 |
| EP | 0985994 | | 3/2000 |
| EP | 1033641 | | 9/2000 |
| EP | 1074009 | | 7/2001 |
| FR | 2711230 | | 4/1995 |
| JP | 06257820 | A * | 9/1994 |
| WO | WO 97/11448 | | 3/1997 |
| WO | WO 97/39392 | | 10/1997 |
| WO | WO 00/43870 | | 7/2000 |
| WO | WO 01/52515 | | 7/2001 |
| WO | WO 01/79952 | | 10/2001 |

OTHER PUBLICATIONS

Trane, "System Programming, Tracer Summit Version 14, BMTW-SVP01D-EN," 623 pages, 2002.
"A Full Range of Alternative User Interfaces for Building Occupants and Operators," http://www.automatedbuildings.com/news/jan00/articles/andover/andover.htm, 5 pages, dated Jan. 2000, printed Sep. 20, 2004.
"CorAccess Systems/In Home," http://web.archive.org/web20011212084427/www.coraccess.com/home.html, 1 page, copyright 2001, printed Aug. 19, 2004.
"HAI Company Background," http://www.homeauto.com/AboutHAI/abouthai_main.htm, 2 pages, printed Aug. 19, 2004.
"High-tech options take hold in new homes—200-08-28—Dallas Business Journal," http://bizjournals.com/dallas/stories/2000/08/28/focus4, 3 pages, dated Aug. 28, 2000, printed Aug. 19, 2004.
"Home Toys Review—TouchLinc", http://www.hometoys.com/htinews/aug99/reviews/touchlinc/touchlinc.htm, 3 pages, dated Aug. 1999, printed Aug. 20, 2004.
"HTI News Release," http://www.hometoys.com/htinews/apr99/releases/ha101.htm, 3 pages, printed Oct. 28, 2004.
"Mark of Excellence Award Finalist Announced," http://64.233.167.104/search?Q=cache:ciOA2YtYaBIJ:www.hometoys.com/releases/mar . . . , 6 pages, Leopard Touchscreen on p. 2, dated prior to Mar. 4, 2000, printed Aug. 20, 2004.
"Product Review—Philips Pronto Remote Control," http://hometheaterhifi.com/volume_6_2/philipsprontoremotecontrol.html, 5 pages, dated May 1999, printed Aug. 20, 2004.
"RC X10 Automation Forum: Control your Heating and Cooling System with Pronto(1/1)," http://www.remotecentral.com/cgi-bin/mboard/rc-x10/thread.cgi?12, 2 pages, dated Apr. 23, 1999, printed Aug. 20, 2004.
"Spotlight on integrated systems," Custom Builder, V8, N2, p. 66(6), Mar.-Apr. 1993.
"Vantage Expands Controls for Audio/Video, HVAC and Security," http://www.hometoys.com/htinews/aug99/releases/vantage03.htm, 2 pages, dated Aug. 3, 1999, printed Aug. 20, 2004.
ADI, "Leopard User Manual," 93 pages, 2001.
Adicon 2500, "The Automator," 4 pages, Oct.-Dec. 2000.
ADT Security Services, "iCenter Advanced User Interface 8142ADT," Installation and Setup Guide, 5 pages, May 2001; First Sale Feb. 2001.
Aprilaire Electronic Thermostats Models 8344, 8346, 8348, 8363, 8365, 8366 Operating Instructions, 8 pages, prior to filed of present application.
Aube Technologies, Electronic Thermostat for Heating System Model TH135-01, 5 pages, Aug. 14, 2001.
Aube Technologies, TH140-28 Electronic Programmable Thermostat, Installation Instructions and User Guide, pp. 1-4, Jan. 22, 2004.
Blake et al., "Seng 310 Final Project Demo Program" Illustration, 3 pages, Apr. 6, 2001.
Blake et al., "Seng 310 Final Project" Report. dated Apr. 6, 2001.
Blister Pack Insert from a Ritetemp 8082 Touch Screen Thermostat Product, 2 pages, 2002.
Braeburn Model 3000 Owner's Manual, pp. 1-13, 2001.
Braeburn Model 5000 Owners Manual, pp. 1-17, 2001.
Braeburn Model 5300 User Manual, 15 pages, 2009.
BRK Electronics Maximum Protection Plus Ultimate Convenience Smoke Alarm, 24 pages, prior to Sep. 21, 2010.
BRK First Alert, User's Manual, Smoke and Fire Alarms, pp. 1-7, Nov. 2002.
Business Wire, "MicroTouch Specialty Products Group to Capitalize on Growing Market for Low-Cost Digital Matrix Touchscreens," p. 1174 (2 pages), Jan. 6, 1999.
Cardio Manual, available at http://www.secant.ca/En/Documentation/Cardio2é-Manual.pdf, Cardio Home Automation Inc., 55 pages, printed Sep. 28, 2004.
Cardio, by Secant; http://www.hometoys.com/htinews/apr98/reviews/cardio.htm, "HTINews Review," Feb. 1998, 5 pages, printed Sep. 14, 2004.
Carrier Microelectronic Programmable Thermostat Owner's Manual, pp. 1-24, May 1994.
Carrier TSTATCCRF01 Programmable Digital Thermostat, pp. 1-21, prior to Sep. 21, 2010.
Carrier, "Programmable Dual Fuel Thermostat," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Manual, pp. 1-8 pages, 1998.
Carrier, "Thermidistat Control," Installation, Start-Up, and Operating Instructions, pp. 1-12, Aug. 1999.
Climatouch, User Manual, Climatouch CT03TSB Thermostat, Climatouch CT03TSHB Thermostat with Humidity Control, Outdoor UHF Temperature Transmitter 217S31, 19 pages, Printed Sep. 15, 2004.
CorAccess, "Companion 6," User Guide, pp. 1-20, Jun. 17, 2002.
Danfoss RT51/51RF & RT52/52RF User Instructions, 2 pages, Jun. 2004.
DeKoven et al., "Designing Collaboration in Consumer Products," 2 pages, 2001.
Domotique Secant Home Automation—Web Page, available at http://www.secant.ca/En/Company/Default.asp, 1 page, printed Sep. 28, 2004.
Firex Smoke Alarm, Ionization Models AD, ADC Photoelectric Model Pad, 4 pages, prior to filing date of present application.
Freudenthal et al., "Communicating extensive smart home functionality to users of all ages: the design of a mixed-initiative multimodal thermostat-interface," pp. 34-39, Mar. 12-13, 2001.
Gentex Corporation, HD135, 135° Fixed Temperature Heat Detector AC Pwered, 120V, 60Hz With Battery Backup, Installation Instructions—Owner's Information, pp. 1-5, Jun. 1, 1998.
Gentex Corporation, 9000 Series, Photoelectric Type Single Station/Multi-Station Smoke Alarms AC Powered With Battery Backup, Installation Instructions—Owner's Information, pp. 9-1 to 9-6, Jan. 1, 1993.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostats, Installation Instructions, pp. 1-8, 2003.

(56) References Cited

OTHER PUBLICATIONS

Honeywell News Release, "Honeywell's New Sysnet Facilities Integration System for Boiler Plant and Combustion Safety Processes," 4 pages, Dec. 15, 1995.
Honeywell T8002 Programmable Thermostat, Installation Instructions, pp. 1-8, 2002.
Honeywell T8602A,B,C,D and TS8602A,C Chronotherm III Fuel Saver Thermostats, Installation Instructions, pp. 1-12, 1995.
Honeywell T8602D Chronotherm IV Deluxe Programmable Thermostats, Installation Instructions, pp. 1-12, 2002.
Honeywell TH8000 Series Programmable Thermostats, Owner's Guide, pp. 1-44, 2004.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, "W7006A Home Controller Gateway User Guide," 31 pages, Jul. 2001.
Honeywell, MagicStat® CT3200 Programmable Thermostat, Installation and Programming Instructions, pp. 1-24, 2001.
http://www.enviromaster.com/faq.asp, "EMI—Enviromaster International LLC, Frequently Asked Questions," 3 pages, printed Jun. 21, 2010.
http://www.cc.gatech.edu/computing/classes/cs6751_94_fall/groupc/climate-2/node1.html, "Contents," 53 pages, printed Sep. 20, 2004.
http://www.ritetemp.info/rtMenu_13.html, Rite Temp 8082, 8 pages, printed Jun. 20, 2003.
http://www.thermostatsales.com, Robertshaw, "9610 Digital Programmable Thermostat," 3 pages, printed Jun. 17, 2004.
http://www.thermostatsales.com, Robertshaw, "9700 Deluxe Programmable Thermostat" 3 pages, printed Jun. 17, 2004.
http://www.thermostatsales.com, Robertshaw, "9710 Deluxe Programmable Thermostat," 3 pages, printed Jun. 17, 2004.
http://www.thermostatsales.com, Robertshaw, "9720 Deluxe Programmable Thermostat," 3 pages, printed Jun. 17, 2004.
http://www.younits.com/fujitsu-uty-rnbyu-wired-remote-control . . . , "Fujitsu UTY-RNBYU Wired Remote Control/Thermostat," 3 pages, printed Jun. 21, 2010.
Hunter, "44200/44250," Owner's Manual, 32 pages, printed prior to Sep. 21, 2010.
Hunter, "44300/44350," Owner's Manual, 35 pages, printed prior to Sep. 21, 2010.
Hunter, "Auto Saver 550", Owner's Manual Model 44550, 44 pages, printed prior to Sep. 21, 2010.
Install Guide for Ritetemp Thermostat 8082, 6 pages, 2002.
Invensys User's Manual, 21 pages, prior to Sep. 21, 2010.
Invensys™, "9700i 9701i 9715i 9720i Deluxe Programmable Thermostats," User's Manual, pp. 1-28, printed prior to filing date.
Lux ELV1 Programmable Line Voltage Thermostat, Installation Instructions, 3 pages, prior to filing date of present application.
Lux TX500 Series Smart Temp Electronic Thermostat, 3 pages, prior to Sep. 21, 2010.
Lux TX9000 Installation, 3 pages, prior to Sep. 21, 2010.
Lux, "511 Series Smart Temp Electronic Thermostat," Owner's Manual, 3 pages, printed prior to Sep. 21, 2010.
Lux, "600 Series Smart Temp Electronic Thermostat," Owner's Manual, 3 pages, printed prior to Sep. 21, 2010.
Lux, "602 Series Multi-Stage Programmable Thermostat," Owner's Manual, 2 pages, printed prior to Sep. 21, 2010.
Lux, "605/2110 Series Programmable Heat Pump Thermostat," Owner's Manual, 3 pages, printed prior to Sep. 21, 2010.
Lux, "700/9000 Series Smart Temp Electronic Thermostat," Owner's Manual, 3 pages, printed prior to Sep. 21, 2010.
Lux, "PSPH521 Series Programmable Heat Pump Thermostat," Owner's Manual, 3 pages, printed prior to filing date.
Lux, "TX1500 Series Smart Temp Electronic Thermostat," Owner's Manual, 6 pages, printed prior to Sep. 21, 2010.
METASYS, "HVAC PRO for Windows User's Manual," 308 pages, 1998.
Mitsubishi Electric, "City Multi Control System and Mitsubishi Mr. Slim Air Conditioners, MA Deluxe Remote Controller, Installation Manual," 8 pages, prior to Sep. 21, 2010.
Mitsubishi Electric, "Cooling and Heating Solutions," 48 ppages, updated Dec. 2009.
Mounting Template for Ritetemp Thermostat 8082, 1 page, 2002.
Operation Manual for Ritetemp Touch Screen Thermostat 8082, 8 pages, 2002.
Prolifix, Inc., "Web Enabled IP Thermostats," Ultimate in Energy Efficiency!, 2 pages, prior to Sep. 21, 2010.
Quick Start Guide for Ritetemp Thermostat 8082, 1 page, 2002.
Remote Control Power Requirement for Ritetemp Thermostat 8082, 1 page, 2002.
Ritetemp Operation 8029, 3 pages, Jun. 19, 2002.
Ritetemp Operation 8050, 5 pages, Jun. 26, 2002.
Ritetemp Operation 8085, pp. 1-6, prior to Sep. 21, 2010.
Sealed Unit Parts Co., Inc., Supco & CTC Thermostats . . . loaded with features, designed for value!, 6 pages, prior to Sep. 21, 2010.
Totaline Model P474-1035 Owner's Manual Programmable 5-2 Day Digital Thermostat, pp. 1-21, prior to Sep. 21, 2010.
Totaline Star CPE230RF, Commercial Programmable Thermostat Wireless Transmitter, Owner's Manual, pp. 1-16, Oct. 1998.
Totaline Star P/N P474-0130 Non-Programmable Digital Thermostat Owner's Manual, pp. 1-22, prior to Sep. 21, 2010.
Totaline, "1 for All programmable Digital Thermostat," Owner's Manual P/N P374-1100FM, 23 pages, Nov. 1998.
Totaline, "1 for All Programmable Digital Thermostat," Owner's Manual P/N P474-1050, 21 pages, Nov. 1998.
Totaline, "1 for All Programmable Digital Thermostat," Owner's Manual P/N P374-1100, 24 pages, Apr. 2001.
Totaline, "Intellistat Combination Temperature and Humidity Control," Owner's Manual P/N P374-1600, 25 pages, Jun. 2001.
Totaline, "Programmable Thermostat Configurable for Advanced Heat Pump or Dual Fuel Operation," Owner's Manual P/N P374-1500, 24 pages, Jun. 1999.
Totaline, "Instructions P/N P474-1010", Manual, 2 pages, Dec. 1998.
Totaline, "Programmable Thermostat", Homeowner's Guide, 27 pages, Dec. 1998.
Totaline, "Wireless Programmable Digital Thermostat," Owner's Manual 474-1100RF, 21 pages, 2000.
Trouble Shooting Guide for Ritetemp Thermostat 8082, 1 page, 2002.
Visor Handheld User Guide, Copyright 1999-2000.
WarmlyYours, "Model TH111GFCI-P (120 VAC)," Manual, pp. 1-4, printed prior to Sep. 21, 2010.
White-Rodgers 1F80-224 Programmable Electronic Digital Thermostat, Installation and Operation Instructions, 8 pages, prior to Sep. 21, 2010.
White Rodgers, "Blue Selecto Thermostat with Automatic Heat/Cool Changeover Option," 8 pages, prior to Sep. 21, 2010.
White-Rodgers Comfort-Set III Thermostat, pp. 1-44, prior to Sep. 21, 2010.
White-Rodgers Installation Instructions for Heating & Air Conditioning IF78 Non-Programmable Thermostat, 6 pages, prior to Sep. 21, 2010.
White-Rodgers Installation Instructions for Heating & Air Conditioning IF78 5/2 Day Programmable Thermostat, 7 pages, prior to Sep. 21, 2010.
White-Rodgers, "Installation Instructions for Heating & Air Conditioning IF72 5/2 Day Programmable Heat Pump Thermostat," 8 pages, printed prior to Sep. 21, 2010.
White-Rodgers, "Comfort-Set 90 Series Thermostat," Manual, pp. 1-24, printed prior to Sep. 21, 2010.
White-Rodgers, 1F80-240 "(for Heating Only systems) Programmable Electronic Digital Thermostat," Installation and Operation Instructions, 8 pages, printed prior to Sep. 21, 2010.
White-Rodgers, 1F80-241 "Programmable Electronic Digital Thermostat," Installation and Operation Instructions, 6 pages, printed prior to Sep. 21, 2010.
White-Rodgers, 1F80-261 "Programmable Electronic Digital Thermostat," Installation and Operation Instructions, 8 pages, printed prior to Sep. 21, 2010.

(56) References Cited

OTHER PUBLICATIONS

White-Rodgers, 1F81-261 "Programmable Electronic Digital Multi-Stage Thermostat," Installation and Operation Instructions, 8 pages, printed prior to Sep. 21, 2010.

White-Rodgers, 1F82-261 "Programmable Electronic Digital Heat Pump Thermostat," Installation and Operation Instructions, 8 pages, printed prior to Sep. 21, 2010.

White-Rodgers, Comfort-Set 90 Series Premium, 4 pages, prior to Sep. 21, 2010.

www.icmcontrols.com, Simplecomfort, SC3000 Single Stage Heat/Single Stage Cool or Single Stage Heat Pump/Manual Changeover, 1 page, printed prior to Sep. 21, 2010.

www.icmcontrols.com, Simplecomfort, SC3001 Single Stage Heat/Single Stage Cool or Single Stage Heat Pump/Manual Changeover, 1 page, printed prior to filing date.

www.icmcontrols.com, Simplecomfort, SC3006 Single Stage Heat/Single Stage Cool or Single Stage Heat Pump/Manual Changeover, 1 page, printed prior to Sep. 21, 2010.

www.icmcontrols.com, Simplecomfort, SC3201 2 Stage Heat Pump Manual Changeover, 1 page, printed prior to Sep. 21, 2010.

www.icmcontrols.com, Simplecomfort, SC3801 2 Stage Heat/2 Stage Cool 2 Stage Heat Pump/Audio.Changeover, 1 page, printed prior to Sep. 21, 2010.

Life's Good (LG), Instruction Manual DFSWLWT0A, 14 pages, Jul. 15, 2009.

\* cited by examiner

REMOTE CONTROL OF AN HVAC SYSTEM THAT USES A COMMON TEMPERATURE SETPOINT FOR BOTH HEAT AND COOL MODES

TECHNICAL FIELD

The disclosure relates generally to HVAC system control, and more particularly, to the remote control of HVAC systems that use a common temperature setpoint for both heat and cool modes.

BACKGROUND

Heating, ventilation, and/or air conditioning (HVAC) systems are commonly used to control the comfort level within a building or other structure. There are various types of HVAC systems that are in use today. Some HVAC systems affect conditions in multiple rooms of a building with a centralized source of heated or cooled air (e.g., central furnace, air conditioner and/or air handler) and a network of ducts, dampers, etc., to manage airflow throughout the building. Other HVAC systems are more limited in extent, such as self-contained window air conditioner. Some HVAC systems, such as mini-split HVAC systems, include an indoor unit that circulates cooled and/or heated air inside a room of the building without a network of ducts, and an outdoor unit connected to the indoor unit via lines carrying a working fluid that transfers heat between the indoor unit and the outdoor unit.

Many HVAC systems include a controller that activates and deactivates one or more HVAC units or components of the HVAC system to affect and control one or more environmental conditions within the building. These environmental conditions can include, but are not limited to, temperature, humidity, and/or ventilation. In many cases, such an HVAC controller may include, or have access to, one or more sensors, and may use parameters provided by the one or more sensors to control the one or more HVAC components to achieve desired programmed or set environmental conditions.

An HVAC controller may be equipped with a user interface that allows a user to monitor and adjust the environmental conditions at one or more locations within the building. With more modern designs, the interface typically includes a display panel, such as a liquid crystal display panel, inset within a housing that contains a microprocessor as well as other components of the HVAC controller. In some designs, the user interface may permit the user to program the controller to control to a certain schedule that is determined by the user. For example, the interface may include a routine that permits the user to set the desired temperature at one or more times during a particular day and/or group of days. In many cases, such a programmable schedule may help reduce energy consumption of the HVAC system by changing the setpoint to an energy saving set back temperature during certain times, such as when the building or space is expected to be unoccupied or when the occupants are expected to be sleeping.

Some HVAC control systems provide an auto changeover mode, in which an HVAC controller may automatically select between the heating and cooling modes of the HVAC system. Some HVAC control systems, such as many mini-split HVAC systems, have an onboard controller that implements such an auto changeover mode using a single or common setpoint. In such systems, the onboard controller of the HVAC system typically commands the HVAC system to heat the air when the current sensed temperature is below the single setpoint, and cool the air when the current sensed temperature is above the single setpoint.

A problem may arise when a single setpoint auto changeover mode is employed in conjunction with a programmable schedule. To illustrate this, one may contemplate a scenario during a summer cooling season, where a cooling setpoint is changed from a setpoint of 72 degrees when an inside space is expected to be occupied (Home), to a setback energy savings temperature setpoint of 80 degrees when the inside space is expected to be unoccupied (Away). In an HVAC control system that has an auto changeover mode that uses a single or common setpoint, the auto changeover logic may command the HVAC system to activate the heat mode when the setpoint changes from 72 degrees to 80 degrees because the sensed inside temperature will be below the new set point temperature of 80 degrees. A similar situation may occur during the heating season. For example, one may contemplate a scenario during the heating season where a heating setpoint is changed from a setpoint of 72 degrees when an inside space is expected to be occupied (Home), to a setback energy savings temperature setpoint of 68 degrees when the inside space is expected to be unoccupied (Away). In an HVAC control system that has an auto changeover mode that uses a single or common setpoint, the auto changeover logic may command the HVAC system to activate the cool mode when the setpoint changes from 72 degrees to 68 degrees because the sensed inside temperature will be above the new set point temperature of 68 degrees. Activating the heating system during the cooling season and/or activating the cooling system during the heating season will tend to reduce the overall energy efficiency of the system.

SUMMARY

The disclosure relates generally to HVAC system control, and more particularly, to the remote control of HVAC systems that use a single or common temperature setpoint for both heat and cool modes. In one illustrative embodiment, an HVAC system includes an HVAC unit having a cooling mode and a heating mode for conditioning the air in an inside space, along with a programmable thermostat located remotely from the HVAC unit. The HVAC unit may have an onboard controller configured to control whether the HVAC unit is in the cooling mode or heating mode, and whether the HVAC unit is activated or not. The onboard controller of the HVAC unit may use a single or common temperature setpoint when controlling in the cooling mode or the heating mode, and may be configured to accept input signals from the remotely located programmable thermostat. In some instances, the remotely located programmable thermostat may have a programmable schedule with a plurality of time periods, where each time period has a heating setpoint and a cooling setpoint separated by a dead band.

The remotely located thermostat may have an auto changeover mode. In the auto changeover mode, the remotely located programmable thermostat may send one or more input signals to the onboard controller of the HVAC unit in accordance with the programmable schedule, where the one or more input signals cause the onboard controller of the HVAC unit to set the HVAC unit to a particular one of the cooling mode and the heating mode, and to activate the HVAC unit so as to condition the air in the inside space in the particular one of the cooling mode and the heating mode.

The above summary is not intended to describe each and every disclosed illustrative example or every implementation of the disclosure. The Description that follows more particularly exemplifies various illustrative embodiments.

BRIEF DESCRIPTION OF THE FIGURES

The following description should be read with reference to the drawings. The drawings, which are not necessarily to scale, depict selected illustrative embodiments and are not intended to limit the scope of the disclosure. The disclosure may be more completely understood in consideration of the following description of various illustrative embodiments in connection with the accompanying drawings, in which.

DESCRIPTION

The following description should be read with reference to the drawings, in which like elements in different drawings are numbered in like fashion. The drawings, which are not necessarily to scale, depict selected illustrative embodiments and are not intended to limit the scope of the invention. Although examples of construction, dimensions, and materials may be illustrated for the various elements, those skilled in the art will recognize that many of the examples provided have suitable alternatives that may be utilized.

Figure 1:
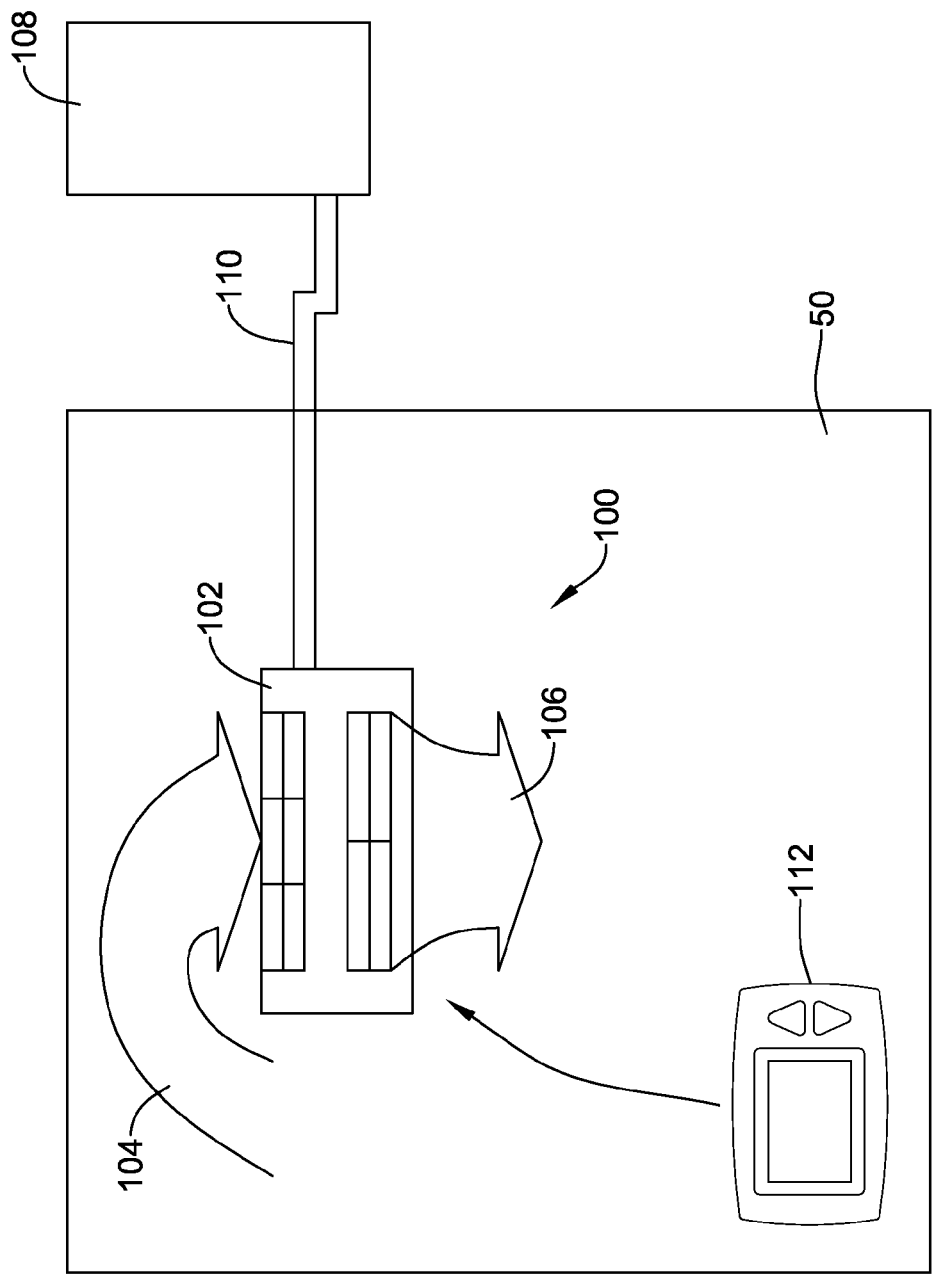
FIG. 1 is a schematic diagram of an illustrative HVAC system that may condition air of an inside space.

FIG. 1 is a schematic diagram showing features of an illustrative HVAC system 100 that may condition air of an inside space 50. HVAC system 100 is shown in FIG. 1 as a mini-split HVAC system, but it is contemplated that any suitable HVAC system may be used. In some illustrative embodiments, the HVAC system may be a window air conditioning unit, or any other suitable HVAC system. The illustrative HVAC system 100 of FIG. 1 includes an indoor unit 102 that may be configured to draw in return air 104 and supply conditioned air 106 to the inside space 50. As shown, indoor unit 102 is configured to handle air 104 and 106 without a network of external ductwork installed within the building, although HVAC systems that include such duct networks may be used as well.

Indoor unit 102 of the mini-split HVAC system 100 may be connected to an outdoor unit 108 via lines 110 carrying a working fluid that transfers heat between the indoor unit 102 and the outdoor unit 108. Outdoor unit 108 may be located in an outdoor space, although this is not necessary. Outdoor unit 108 will generally be placed in a different space than indoor unit 102. HVAC system 100 may be configured with a cooling mode and a heating mode for conditioning air.

Indoor unit 102 may include an onboard controller (not explicitly shown in FIG. 1) configured to control at least parts of the HVAC system 100, as described further herein. The onboard controller may be configured to control whether the HVAC unit is in the cooling mode or heating mode, and whether the HVAC unit is currently activated or not. HVAC system 100 may include an external thermostat 112, which may be located remotely from the indoor unit. The external thermostat 112 may be configured to communicate wirelessly with the onboard controller of indoor unit 102, and the onboard controller may be configured to accept input signals from the remotely located thermostat. In some illustrative embodiments, an external thermostat 112 may communicate with the onboard controller of the HVAC system 100 via a wired communication link. Communication between the external thermostat 112 and the onboard controller of indoor unit 102 may be unidirectional (e.g. from external thermostat to internal controller) or bidirectional, as desired.

Figure 2:
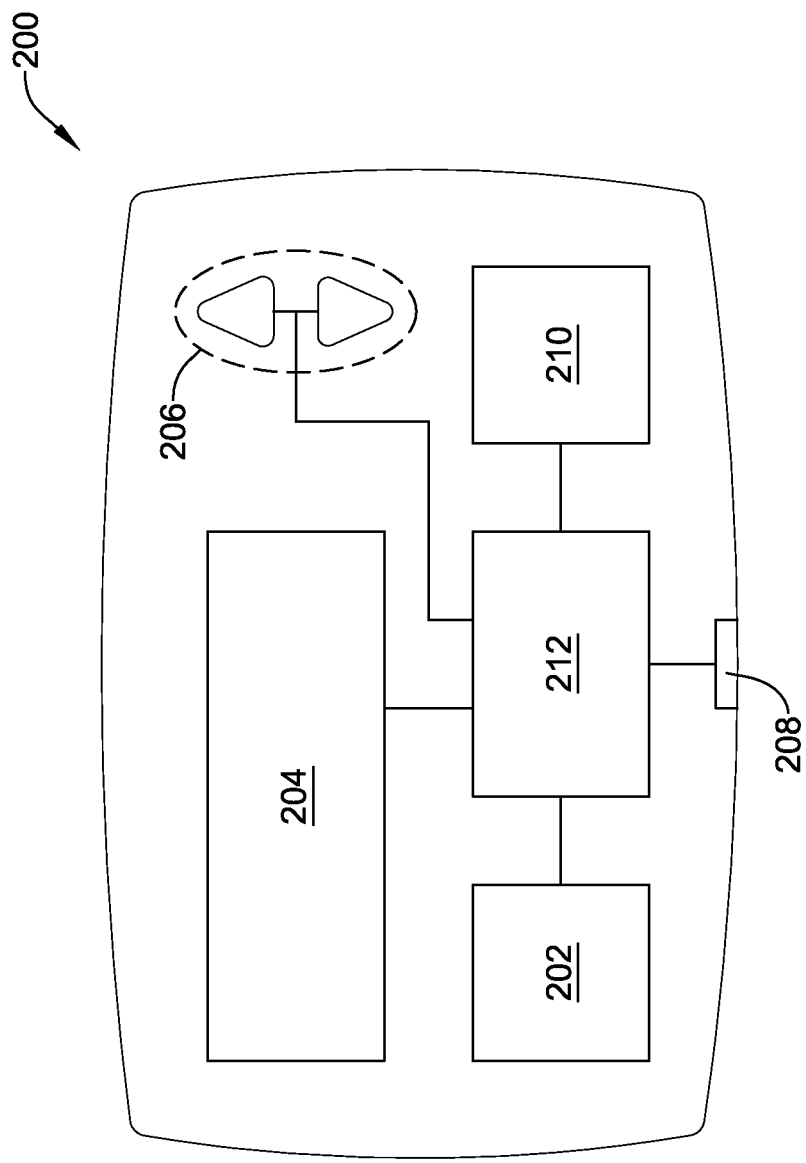
FIG. 2 is a schematic diagram of a remotely located programmable thermostat that may be used with the HVAC system of FIG. 1.

FIG. 2 is a schematic diagram of a remotely located programmable thermostat 200, which may be the same or similar to external thermostat 112 of FIG. 1. Remotely located programmable thermostat 200 may include a memory 202 for storing operational parameters of the thermostat, which may also be operational parameters of the HVAC system. Such parameters may include setpoints such as temperature setpoints. Remotely located programmable thermostat 200 may include a user interface configured to allow a user to modify the operational parameters. The user interface may include a display 204 and any suitable configuration of buttons, switches, etc. 206. The display 204 may be any suitable display employing any suitable display technology, such as LCD, OLED, etc. Display 204 may be a touchscreen display and may provide any suitable touchscreen controls, which may supplement and/or replace physical buttons, switches, etc. 206.

Remotely located programmable thermostat 200 may be configured to communicate wirelessly with the onboard controller of an indoor unit such as indoor unit 102 of FIG. 1. Remotely located programmable thermostat 200 may include a transmitter 208 configured to wirelessly transmit commands or other input signals to the indoor unit, or an onboard controller of the indoor unit. Transmitter 208 may be considered an output of the remotely located programmable thermostat 200. It is contemplated that transmitter 208 may transmit input signals to the indoor unit using wireless and/or wired communication. (e.g. IR, RF, blue tooth, Zigbee, Ethernet, etc.).

Remotely located programmable thermostat 200 may include a temperature sensor 210 of any suitable variety, which may be used for detecting air temperature of the space in which the external thermostat is disposed. In some instances, the temperature sensor 210 may be located within the housing of the remotely located programmable thermostat 200. In other cases, the temperature sensor 210 may be located remotely from remotely located programmable thermostat 200.

Remotely located programmable thermostat 200 may include a controller or microprocessor 212 operatively coupled to the memory 202, the user interface, the transmitter 208 and the temperature sensor 210. The controller or microprocessor 212 may be configured or programmed to perform any appropriate steps for controlling the remotely located programmable thermostat 200, including sending appropriate control signals to the HVAC system 100.

Figure 3:
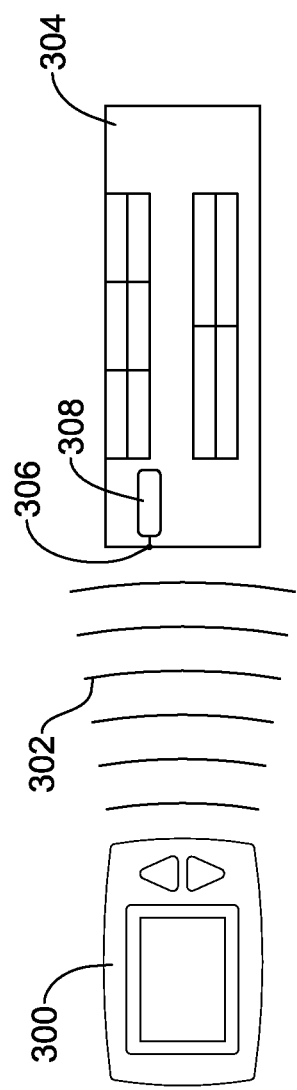
FIG. 3 is a schematic depiction of a remotely located programmable thermostat transmitting an infrared signal to an indoor unit of an HVAC system.
Figure 4:
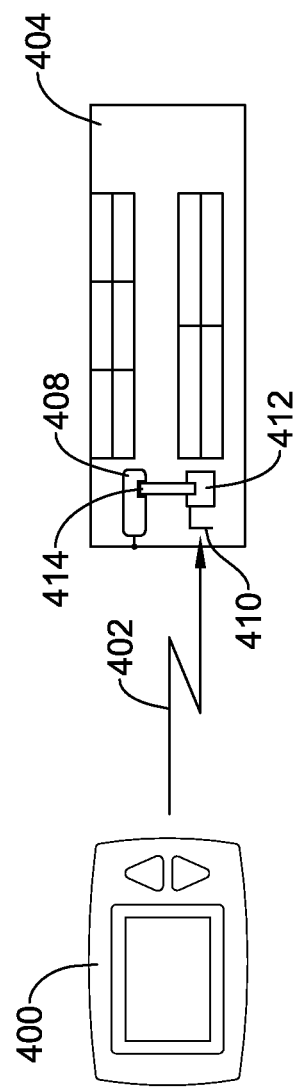
FIG. 4 is a schematic depiction of a remotely located programmable thermostat transmitting a wireless signal to an indoor unit of an HVAC system via an internal equipment interface module.
Figure 5:
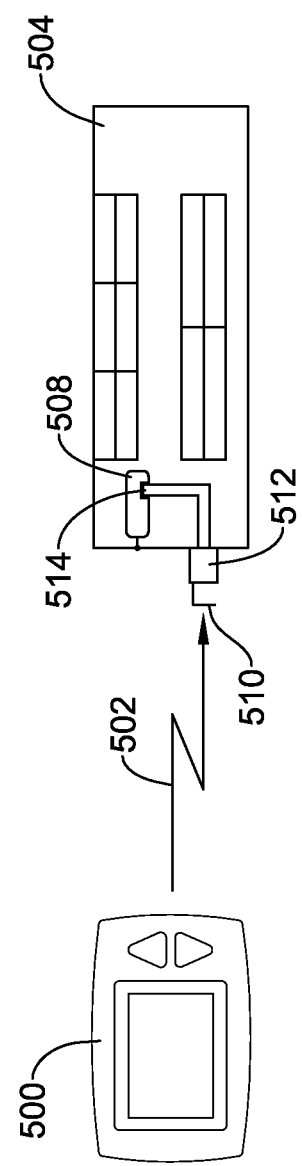
FIG. 5 is a schematic depiction of a remotely located programmable thermostat transmitting a wireless signal to an indoor unit of an HVAC system via an external equipment interface module.

FIGS. 3-5 illustrate a variety of pathways by which a remotely located programmable thermostat, such as thermostats 112 and 200 of FIGS. 1 and 2 respectively, may transmit operational parameters, commands, and/or any other suitable input signals to an indoor unit of an HVAC system, such as indoor unit 102 of HVAC system 100 of FIG. 1. FIG. 3 is a schematic depiction of a remotely located programmable thermostat 300 transmitting an infrared (IR) signal 302 to an indoor unit 304 of an HVAC system. Indoor unit 304 includes an IR receiver 306 operatively coupled to an onboard controller 308 of the indoor unit 304. In some embodiments, a remotely located programmable thermostat may transmit a radio-frequency (RF) signal to an antenna operatively coupled to an onboard controller of an indoor unit, either in addition to the IR signal of FIG. 3, or as an alternative to the IR signal.

FIG. 4 is a schematic depiction of a remotely located programmable thermostat 400 transmitting a wireless signal to an indoor unit 404 of an HVAC system. In the illustrative configuration of FIG. 4, remotely located programmable thermostat 400 transmits an RF signal 402, which is received by an antenna/receiver 410 of an equipment interface module 412, which is communicatively coupled to a control port 414 of onboard controller 408 of indoor unit 404. While remotely located programmable thermostat 400 of FIG. 4 is illustrated as transmitting to equipment interface module 412 via radio frequency (RF), in some illustrative embodiments, other communication modalities may be employed, such as IR communication.

Equipment interface module 412 may be configured to transmit command signals or any other appropriate input signals to the onboard controller 408 of the indoor unit 404 of the HVAC system via the control port 414 via a communication protocol that the onboard controller 408 is configured to accept and interpret. Operational parameters may be passed to the onboard controller 408 via the equipment interface module via this information path. Commands, operational parameters, and other input signals transmitted to the onboard controller 408 from the equipment interface module 412 may be based upon information or messages, etc., encoded in wireless signals received by the equipment interface module 412 from the remotely located programmable thermostat 400. The equipment interface module 412 may be configured to translate between different communication protocols, for example, from (i) a remotely located programmable thermostat to equipment interface module protocol, and (ii) an equipment interface module to onboard controller protocol.

While FIG. 4 illustrates an equipment interface module 412 as being disposed within a housing of indoor unit 404, this is not required. In some illustrative embodiments, as shown in FIG. 5, an equipment interface module 512 may be disposed external to a housing of an indoor unit 504. Equipment interface module 512 may be communicatively coupled to a control port 514 of an onboard controller 508 of indoor unit 504.

The onboard controller of any of the indoor units 102, 304, 404, 504 may be configured to control the HVAC system in accordance with control parameters, which the onboard controller may store in a memory. The onboard controller may be configured to accept external input signals specifying one or more of the control parameters. Such external input may come directly from a remotely located programmable thermostat, such as via an IR signal 302 from remotely located programmable thermostat 300 of FIG. 3, or may come from an equipment interface module via a control port of the onboard controller, as schematically illustrated in FIGS. 4 and 5.

In any event, and in some illustrative embodiments, the control parameters may include a parameter designating an onboard control mode for the onboard controller of the HVAC system. The onboard control mode may be selected from, for example, a heating mode, a cooling mode, an auto changeover mode, and/or an off or standby mode. In some cases, the control parameters may include an onboard setpoint and/or a current control or sensed temperature. The onboard setpoint may be a temperature setpoint that the onboard controller is configured to control to, and may also be referred-to as a control setpoint of the onboard controller.

As detailed above, in some HVAC system that have both heating and cooling modes, a common temperature setpoint may be used by the onboard controller when controlling in the cooling mode and the heating mode. In some HVAC systems, such as in some mini-split HVAC systems, the current control (or sensed) temperature may be a temperature sensed by a temperature sensor of the indoor unit that provides a measure related to the air temperature local to the indoor unit. Such a temperature sensor may, for example, be disposed in the return air stream drawn into the indoor unit, and may provide the measured temperature to the onboard controller as the current control (or sensed) temperature. In some cases, the current control (or sensed) temperature may be provided by a remote device such as a remote programmable thermostat, a remote temperature sensor, or some other device, and then transmitted to the onboard controller of the HVAC system. In some illustrative embodiments, an artificial value (e.g., a value not originating from an actual physical temperature measurement, and in some cases a value that does not actually correspond to a temperature sensor reading) may be provided to the onboard controller to serve as the current control (or sensed) temperature, as further described herein.

Control of the HVAC system by the onboard controller in accordance with control parameters may depend on the onboard control mode that is presently in effect. When in a heating control mode, for example, the onboard controller may activate the HVAC unit in the heating mode to heat air when the current control temperature is below the onboard temperature setpoint by at least a first predetermined amount, and not heat air when the current control temperature is not below the onboard temperature setpoint by at least a second predetermined amount. The first and second predetermined amounts may be the same, or they may be different, and may, for example, reduce the frequency of on-off cycling, or "short-cycling." Similarly, when in a cooling control mode, the onboard controller may activate the HVAC unit in the cooling mode to cool air when the current control temperature is above the onboard setpoint by a predetermined amount, and not cool air when the current control temperature is not above the onboard setpoint by a predetermined amount.

In some illustrative embodiments, an onboard controller may be configured to control an HVAC system in an auto changeover control mode with a single or common temperature setpoint. In such an onboard control mode, the onboard controller may command the HVAC to heat air when the current control temperature is below the onboard temperature setpoint, and cool air when the current control temperature is above the onboard temperature setpoint. In such a single setpoint auto changeover control mode, a dead band around the onboard temperature setpoint setpoint may be defined where the onboard controller will neither heat nor cool air if the current control temperature falls within the dead band. The use of a dead band may help prevent undesired short cycling between the cooling and heating modes. The magnitude of the dead band may be determined in any appropriate manner, but is typically defined as +/−X degrees from the single or common temperature setpoint, where X is an integer value.

As mentioned herein, a remotely located programmable thermostat, such as remotely located programmable thermostats 112, 200, 300, 400, 500, may communicate or transmit operational parameters or control parameters for input to, for example, an onboard controller of an indoor unit of an HVAC system. In some illustrative embodiments, a remotely located programmable thermostat may serve as a "remote control" and may provide a user interface for a user to enter control parameters, such as onboard control mode and onboard setpoint, to an onboard controller. With appropriate programming, however, the remotely located programmable thermostat may provide more sophisticated capabilities than the simple remote control function of allowing real-time modification of control parameters by a user.

In some cases, the determination of whether to heat, cool, or not modify the temperature of air may be made by an onboard controller of an HVAC system on the basis of a comparison of a current control (or sensed) temperature with the onboard temperature setpoint, in accordance with the onboard control mode, as described herein. In some illustrative embodiments, the determination of whether to heat, cool, or not modify the temperature of air may be made instead by a remote or external programmable thermostat disposed elsewhere in the inside space. The external or remote thermostat may make the determination of whether modification of the air temperature is desired by comparing the air temperature sensed by a temperature sensor of the external or remote thermostat with one or more setpoints. The comparison may be a determination of whether the sensed temperature in the inside space is different from a currently active setpoint by at least a predetermined amount. Subsequently to making the determination, the external or remote thermostat may communicate input signals (wirelessly or otherwise) to the onboard controller or the HVAC system to result in external input of control parameters such that the onboard controller will command the HVAC unit to operate in a cooling mode, a heating mode, or a standby mode (neither cooling nor heating), according to the determination performed by the external or remote thermostat.

In some cases, the onboard controller may evaluate the control parameters, including those externally input (e.g. comparing the current control temperature with the onboard setpoint), and then activate the HVAC unit to operate in the cooling mode, the heating mode, or the standby mode, in accordance with the onboard control mode, and in accordance with the determination by the external thermostat of whether modification of the air temperature is desired.

In some cases, while the onboard controller may make a determination of whether to heat or cool, that determination may be made on the basis of control parameters externally input to the onboard controller based upon a primary determination of whether to heat or cool that is performed by the remote thermostat. The control parameters externally input to the onboard controller may be the same parameters considered by the remote thermostat in performing the determination of whether modification of the air temperature is desired. For example, the remote thermostat may determine, based upon a heating setpoint of 68 degrees and a sensed air temperature of 66 degrees, that heating is desired. The remote thermostat may communicate to the on board controller (whether directly, or, for example, via an equipment interface module) such that external input of the following control parameters is made: set the heating control mode, set the onboard setpoint to 68 degrees, and set the current control (or sensed) temperature equal to sensed air temperature (e.g. 66 degrees). Such control parameters may then result in the onboard controller setting the current mode to the heat mode, and activating the HVAC system to heat the air.

It is not necessary, however, to externally input the same parameters to the onboard controller that the remote thermostat uses to make the determination whether to heat or cool. In some illustrative embodiments, any externally input control parameters that are effective to achieved the desired operation of the HVAC system may be used. For example, once the remote thermostat determines that heating is desired, it may cause external input to be provided to the onboard controller of a heating setpoint of, say 78 degrees, and a current control temperature of, say 60 degrees, with the onboard controller in the heating control mode. Either or both of these values may be artificial control values, in the sense that the 78 degree heating setpoint may not represent an actual desired setpoint to which the air temperature is to be controlled, and the temperature of 60 degrees may not represent an actual measured temperature. The values may be effective, regardless, in causing the onboard controller to determine that heating is desired, and thus, may activate the heating mode of the HVAC system. Once the remote thermostat determines that heating is no longer desired (e.g. by comparing a schedule temperature setpoint with a measured or sensed temperature), it may cause external input of control parameters such that the onboard controller will command the HVAC system into an off or standby mode. Thus, in some embodiments, the remote thermostat will actually control when the HVAC system is activated and subsequently deactivated by providing appropriately timed external input that will cause the onboard controller of the HVAC system to perform the desired activation and deactivation.

In another example of external input of control parameters, the onboard controller may be placed in a single setpoint auto changeover mode, with the onboard setpoint set to 70 degrees. When the remote thermostat determines that no modification of air temperature is desired, the current control temperature may be externally set to 70 degrees (within the dead band where the HVAC system remains in standby mode). If the remote thermostat subsequently determines that heating is desired, the current control (or sensed) temperature of the onboard controller may be externally set to 60 degrees (arbitrary value that is well below the setpoint). If the remote thermostat determines that cooling is desired, the current control (or sensed) temperature of the onboard controller may be externally set to 80 degrees (arbitrary value that is well above the setpoint).

In another example of external input of control parameters, the onboard controller may be configured to use a temperature measured at the indoor unit as the current control (or sensed) temperature, with external input of an onboard control mode and onboard setpoint employed to cause the onboard controller to command heating or cooling. For example, if the remote thermostat determines that heating is desired, the onboard control mode may be externally set to heating control mode, and the onboard setpoint may be externally input with an artificial control setpoint of 90 degrees. If the remote thermostat determines that cooling is desired, the onboard control mode may be externally set to cooling control mode, and the onboard setpoint may be externally input with an artificial control setpoint of 50 degrees. These externally input artificial control setpoints, in combination with the current control temperature, may be sufficient to cause the onboard controller to command heating or cooling, respectively, as long as the actual measured current control temperature does not have an extreme value outside of a range that might reasonably be expected.

When an remote thermostat communicates to an onboard controller such that control parameters are externally input into the onboard controller, there may be multiple ways by which such external input may be achieved. The remote thermostat may transmit input signals with control parameters to the onboard controller essentially directly, in a configuration such as that of FIG. 3, for example. In some illustrative embodiments, the remote thermostat may communicate to an equipment interface module, as in the configuration of FIGS. 4 and 5, and the equipment interface module may in turn provide input signals with the control parameters to the onboard controller. In configurations where the remote thermostat communicates to the onboard controller via an equipment interface module, the remote thermostat may provide specific control parameters to the equipment interface module to be input into the onboard controller, but this is not necessary in all cases. In some illustrative embodiments, an remote thermostat may send a "call for heat" or "call for cool" signal (without other control parameters) to the equipment interface module, and the equipment interface module may then, in turn, provide appropriate input signals with control parameters (such as onboard control mode, onboard setpoint, current control temperature, etc.) to the onboard controller that will be effective in inducing the onboard controller to command the HVAC system to heat or cool as appropriate. In some illustrative embodiments, an onboard controller itself may be configured to accept a "call for heat" and/or "call for cool" command and control the HVAC system accordingly, but in other illustrative embodiments, onboard controllers are not configured to accept "call for heat" or "call for cool" input signals.

A remote thermostat, such as any of those described herein, or any other HVAC controller, may maintain in its memory a recurring schedule, which may represent the normal programmable schedule of a programmable thermostat. The schedule may be, for example, a 7 day programmable schedule (where each of the seven days of the week can have a separate schedule), a 5-2 programmable schedule (where the five week days have a common schedule, and the two weekend days have a common schedule), or any other schedule. The schedule may have a plurality of time periods, in any suitable arrangement. In some cases, the schedule may have a number of days and one or more time periods for each of at least some of the days. In some instances, the schedule may include a "sleep," a "wake," a "leave," and a "return" time period for each of the days of a week.

Figure 6:
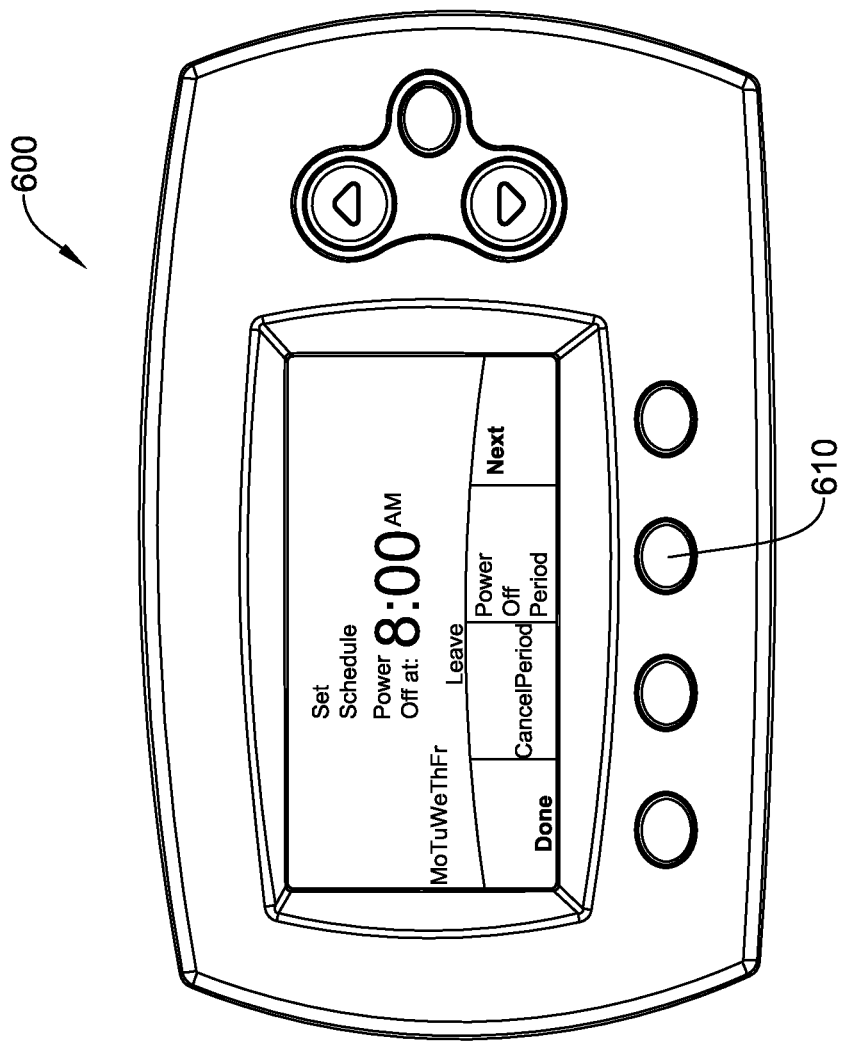
FIG. 6 is a schematic illustration of a remotely located programmable thermostat showing aspects of a user interface for modifying a recurring schedule.

An HVAC controller/thermostat may provide a user interface configured to allow manual modification by a user of a recurring schedule, and potentially configured to allow manual modification by a user of any parameter, or set of parameters, of a recurring schedule. The user interface may be configured to display any and all parameters of the remote thermostat and/or HVAC system, such as control modes, setpoints, beginning and/or end times of time periods, and the like. These parameters may be displayed during user programming as well as during ongoing system operation. FIG. 6 is a schematic illustration of a remote thermostat showing aspects of a user interface for modifying a recurring schedule. In the mode illustrated, pressing button 610 allows a user to designate an HVAC-off control mode, as discussed further herein, for one or more particular time periods of the schedule (e.g. the "leave" time periods on weekdays).

The recurring schedule may have a control mode associated with each of the one or more time periods, such as, for example, a cooling mode, a heating mode, an auto changeover mode, or an off mode, but it is not necessary to associate a control mode with every time period. For time periods for which a control mode is not associated, a default, override, instant, or last-used control mode may be used. The schedule may have one or more setpoints associated with any or each of the one or more time periods, although, similar to control modes, it is not necessary to associate all types of setpoints with every time period. A time period may be associated with either or both of a cooling setpoint and a heating setpoint. The one or more setpoints associated with a time period may be used by the remote thermostat during the corresponding time period in making the determination whether heating or cooling is desired, in accordance with the control mode associated with or otherwise active during the corresponding time period of the schedule. Setpoints may be associated with time periods, even if the control mode in force during the time period does not necessarily employ the setpoint. For example, a time period associated with a cooling mode may have an associated heating setpoint. The heating setpoint may not be employed in the cooling mode, but may be retained in memory for potential use if the control mode is changed to heating or auto changeover. Similarly, neither of a heating setpoint nor cooling setpoint may be employed if the "off" control mode is associated with a time period, but the setpoints are available for potential use in other modes. In an "off" control mode, the HVAC system is controlled to minimize energy use by neither heating nor cooling during the time period(s) with which it is associated. In some embodiments of the present disclosure, a thermostat may be configured to select between a heating setpoint and a cooling setpoint during any time period for use in comparing with a current (or sensed) temperature, in accordance with the control mode in effect during the time period (heating, cooling, or auto changeover).

Control modes, whether those of a remote thermostat, onboard controller, or other HVAC control system, may be considered as HVAC-on or HVAC-off control modes. In an HVAC-on control mode, an HVAC controller may cycle an HVAC unit on and off as required, for example, to control the control (or sensed) temperature of the inside air of the building in accordance with a setpoint. Thus, the cooling, heating, and auto changeover modes may be considered HVAC-on modes (e.g., HVAC-on-cool, HVAC-on-heat, HVAC-on-auto changeover). In an HVAC-off control mode, an HVAC controller may not cycle the HVAC unit on, regardless of the control (or sensed) temperature of the inside air or any other control parameter.

The use of an HVAC-off control mode in conjunction with a recurring schedule may allow an HVAC controller to deliver energy savings beyond those attainable with a conventional energy-savings setback schedule. In a conventional energy-savings setback schedule, a setpoint may be set back during a period such as an unoccupied "leave" period, but generally the HVAC system will be activated if the control or sensed temperature reaches the setback setpoint. During a time period associated with an HVAC-off control mode, the HVAC system generally will not be activated regardless of HVAC parameters, with attendant energy savings. HVAC-off may be designated for time periods of a recurring schedule when occupancy of an indoor space is not expected.

In some instances, an HVAC-on time period may follow an HVAC-off time period in a recurring schedule. In such a situation, a controller may be programmed to initiate setpoint recovery before the end of the HVAC-off time period, or it may be programmed to not allow HVAC system activation until the end of the HVAC-off period.

Figure 7:
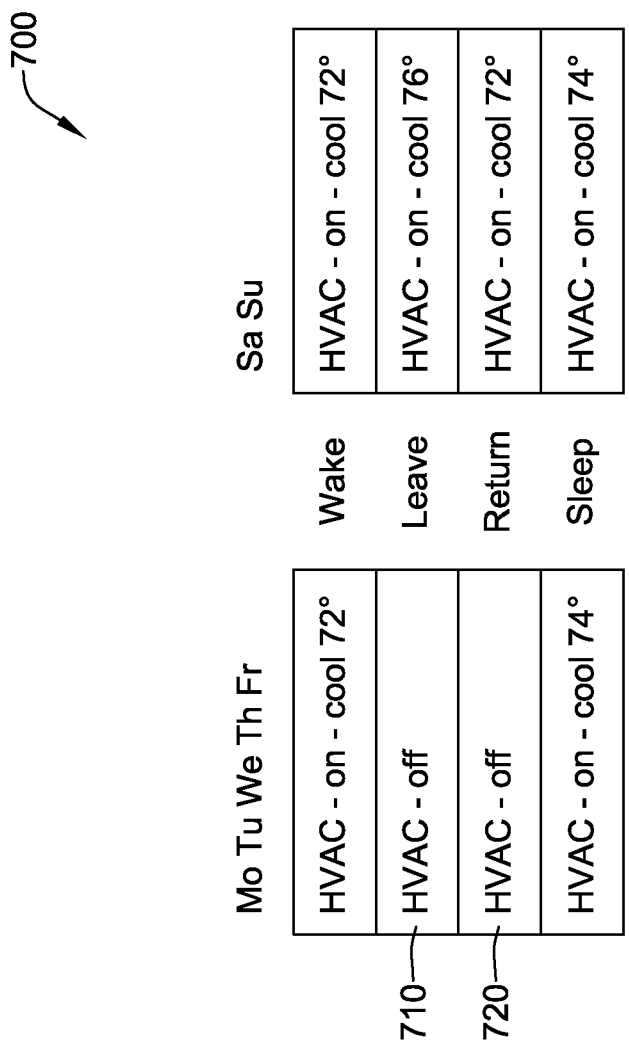
FIG. 7 is a table representing a recurring programmable schedule of a remotely located programmable thermostat.

FIG. 7 is a table representing an example of a recurring programmable schedule 700 of an HVAC controller. Schedule 700 is a 5-2 schedule (weekdays & weekend) having wake, leave, return, and sleep time periods. In schedule 700, weekday leave 710 and return 720 time periods are associated with the HVAC-off control mode. During these time periods, the HVAC system will not be turned on regardless of the sensed temperature in the inside space. Other time periods are associated with HVAC-on-cool, with various cooling setpoints. This schedule may represent, for example, the schedule for a mini-split air conditioner in an add-on room that, in the summer, is used for sleeping during the week and miscellaneous purposes during the weekends, but is unoccupied during the day and before bedtime during the week.

In some HVAC controllers incorporating a programmable HVAC-off control mode, the controller may include a configuration setting to optionally disable the HVAC-off control mode. Such a configuration setting may be adjustable by a technician and/or end user. A disabled HVAC-off control mode may then be unavailable to be associated with a recurring program time period. In some HVAC controllers incorporating a programmable HVAC-off control mode, the controller may include a feature to optionally provide an HVAC-off emergency override. Such an override may, for example, activate the HVAC system during an HVAC-off time period if one or more specified criteria are met, such as indoor and/or outdoor temperature values, other environmental parameters, signals from a source internal or external to the inside space, such as from a utility or regional authority, or any other appropriate criteria.

EXAMPLE 1

In one example, a mini-split system may be configured to both heat and cool air. An onboard controller is provided with the indoor unit of the mini-split system. The onboard controller is configured to control the HVAC system in accordance with a current control (or sensed) temperature and a common temperature setpoint in an onboard control mode that may be a heating control mode, a cooling control mode, an auto changeover control mode, or an off/standby/deactivated control mode. The onboard controller is configured to accept input signals specifying external selection of the onboard control mode, external input of onboard setpoint, and external override of the current control (or sensed) temperature.

A remote thermostat (controller) is configured to control the mini-split system. The remote thermostat transmits commands wirelessly to an equipment interface module disposed adjacent to, or within the housing of the indoor unit of the mini-split system. The equipment interface module is communicatively coupled to the onboard controller via a control port of the onboard controller. The remote thermostat may transmit commands or input signals to the equipment interface module that cause the equipment interface module to externally select/input and/or override the onboard controller with an onboard control mode, onboard setpoint, and/or current control temperature, such that the onboard controller commands the HVAC system to enter into a heating or cooling mode, activate, and/or not activate, in agreement with the commands transmitted to the equipment interface module from the remote thermostat. The commands transmitted to the equipment interface module from the remote thermostat may include "call for heat"/"call for cool," or they may include specific control parameters to externally input/set to the onboard controller.

The remote thermostat maintains in memory, and controls the HVAC system in accordance with, a recurring schedule having a plurality of time periods. The recurring schedule includes a first time period having heating and cooling setpoints separated by a dead band. The schedule further includes a second time period immediately following the first time period having associated energy-saving heating and cooling setpoints that are set back from the heating and cooling setpoints of the first time period, and separated by an energy-saving dead band. The remote thermostat includes a temperature sensor that measures the current temperature. During at least the first and second time periods, the remote thermostat controls the HVAC system in an auto changeover mode using both heating and cooling setpoints such that: (1) if the current temperature is within the associated dead band, the remote thermostat commands the HVAC system to neither heat nor cool; (2) if the current temperature is below the associated heating setpoint, the remote thermostat commands the HVAC system to heat; and (3) if the current temperature is above the associated cooling setpoint, the remote thermostat commands the HVAC system to cool.

Thus, in this arrangement, the HVAC system is controlled in a dual-setpoint auto changeover mode by the remote thermostat, even though the onboard controller of the HVAC system may be configured only for single-setpoint auto changeover operation.

EXAMPLE 2

In another example, a mini-split system is configured like that of Example 1, with the following differences. The remote thermostat communicates input signals to the onboard controller without an intervening equipment interface module. The remote thermostat externally selects/inputs an onboard control mode and an onboard setpoint to the onboard controller. The onboard controller controls in accordance with a current control temperature measured by a temperature sensor disposed in or on indoor unit, or in its vicinity. When the remote thermostat determines that heating is desired, the remote thermostat transmits an input signal to the onboard controller to select/input an onboard control mode and a value for the onboard setpoint that will be effective to cause the onboard controller to command the HVAC system to heat. The value(s) sent to be input as the onboard setpoint may be sufficiently higher than a presumed temperature range of the measured current control (or sensed) temperature to trigger determination by the onboard controller that heating is desired. Similarly, when the remote thermostat determines that cooling is desired, the remote thermostat transmits an input to the onboard controller to select/input an onboard control mode and a value for the onboard setpoint that will be effective to cause the onboard controller to command the HVAC system to cool. The value(s) sent to be input as the onboard setpoint may be sufficiently lower than a presumed temperature range of the measured current control temperature to trigger determination by the onboard controller that cooling is desired. When the remote thermostat determines that neither cooling nor heating is desired, the remote thermostat transmits to the onboard controller to set/input to the onboard controller control parameters effective to cause the onboard controller to command the HVAC system into a standby or off mode. These control parameter can include an onboard control mode and/or onboard setpoint, as desired.

EXAMPLE 3

An example method for controlling a mini-split system HVAC unit via a thermostat that is located in an inside space remotely from the HVAC unit is disclosed. The HVAC unit has a cooling mode and a heating mode, and an onboard controller configured to control which mode the unit is in, and whether it is activated or not. In this example, the onboard controller is configured to accept input signals wirelessly transmitted from the remotely located thermostat.

Figure 8:
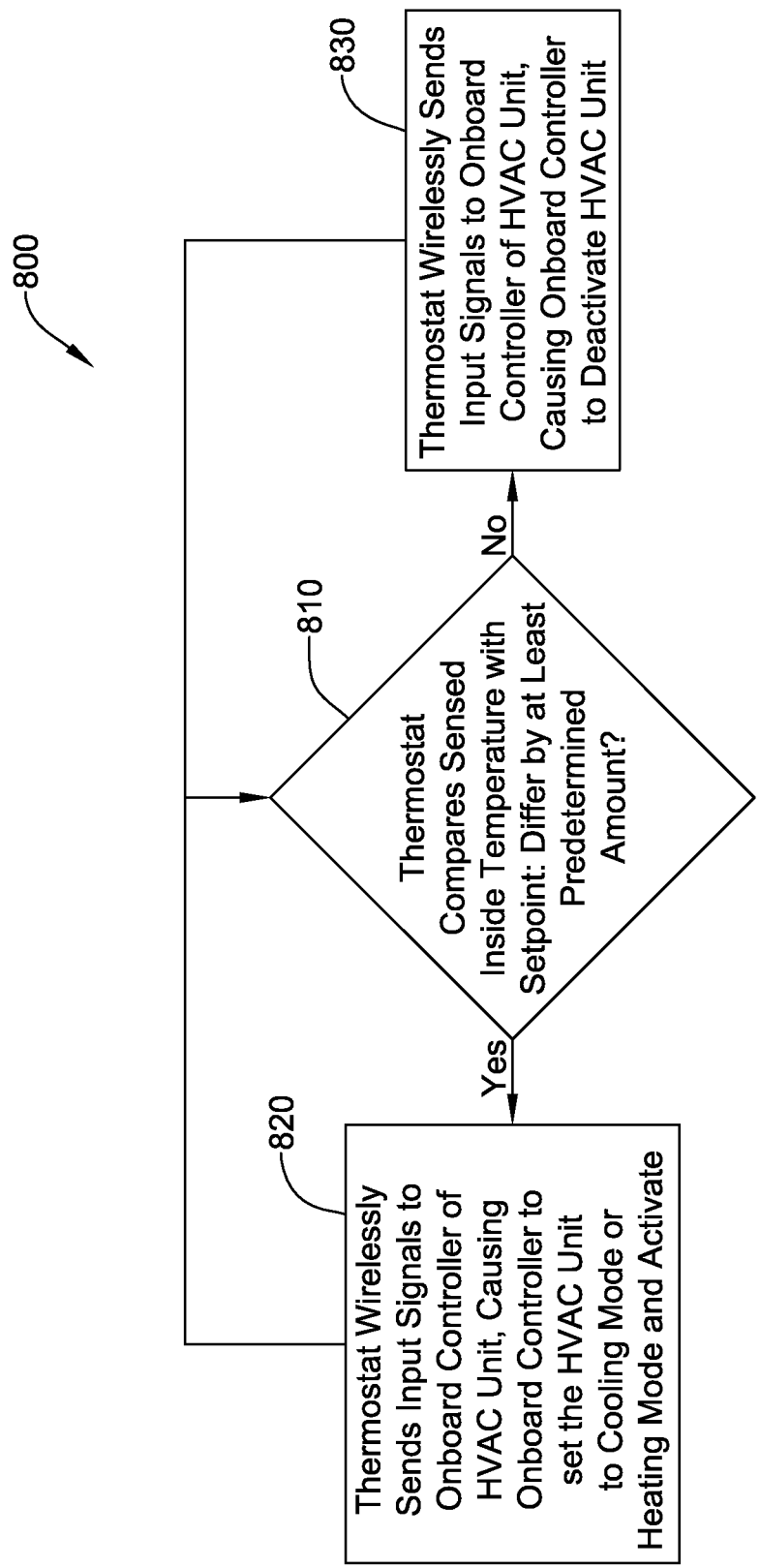
FIG. 8 is a flowchart showing an illustrative method for controlling a mini-split HVAC system via a remotely located programmable thermostat that is located remotely from the inside unit of the mini-split HVAC system.

FIG. 8 is a flowchart illustrating the method 800. At 810, the remotely located thermostat compares a sensed temperature in the inside space with a setpoint, and determines if the sensed temperature in the inside space is different from the setpoint by at least a predetermined amount. If the sensed temperature in the inside space is different from the setpoint by at least the predetermined amount, at 820 the thermostat wirelessly sends one or more input signals to the onboard controller of the HVAC unit, causing, as described herein, the onboard controller of the HVAC unit to set the HVAC unit to a particular one of the cooling mode and the heating mode, and to activate the HVAC unit so as to condition the air in the inside space in accordance with a control setpoint. Returning to 810, the thermostat continues to compare the sensed temperature with the setpoint. If the sensed temperature in the inside space becomes not different from the setpoint by at least the predetermined amount, at 830 the thermostat sends one or more input signals to the onboard controller of the HVAC unit that cause the onboard controller to deactivate the HVAC unit.

In this method, either or both of the HVAC unit and the remotely located thermostat may include a temperature sensor that provides a measure related to the air temperature, and provide the measure to the onboard controller. The onboard controller may control the sensed measure to the control setpoint while the HVAC system is in the cooling mode or the heating mode.

The thermostat may maintain in memory a schedule having a plurality of time periods, with each time period having one or more time period setpoints. These setpoints may be used in the comparing step 810. Some of the plurality of time periods may include both a heating setpoint and a cooling setpoint, in which case the remote thermostat may be configured to select between the setpoints for use in the comparing step.

EXAMPLE 4

Figure 9:
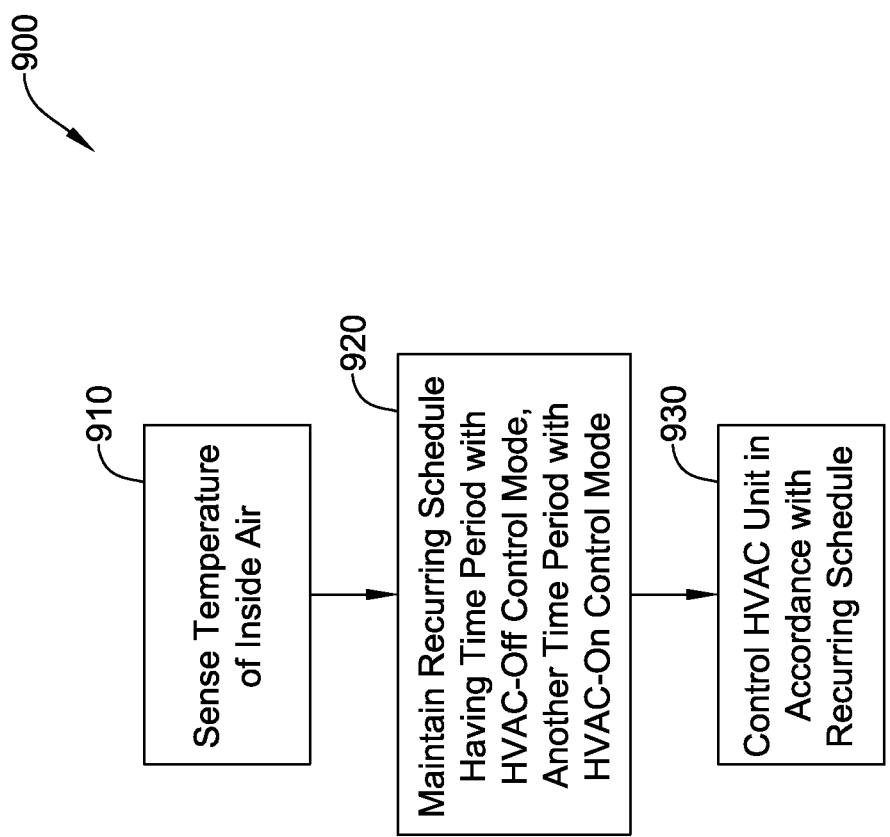
FIG. 9 is a flowchart showing an illustrative method for operating an HVAC system according to a recurring schedule having an HVAC-off time period.

Another example method for operating an HVAC system having an HVAC unit for conditioning inside air of a building and an HVAC controller for controlling the HVAC unit is shown in FIG. 9. The HVAC system may be any suitable HVAC system. It may, for example, be a whole house furnace/air conditioner, a mini-split system, or a one-piece air conditioner (window/in-wall/free-standing/etc.). FIG. 9 is a flowchart illustrating the method 900. At 910, the method includes sensing a temperature of the inside air of the building. At 920, the method includes maintaining in the memory of the HVAC controller a recurring schedule having a number of time periods. At least one of the time periods is associated with an HVAC-off control mode, in which the HVAC unit does not condition the inside air of the building regardless of the sensed temperature of the inside air. At least another one of the time periods is associated with an HVAC-on control mode in which the HVAC unit controls the sensed temperature of the inside air of the building in accordance with one or more setpoints. At 930, the method includes controlling the HVAC unit with the HVAC controller in accordance with the recurring schedule.

Figure 10:
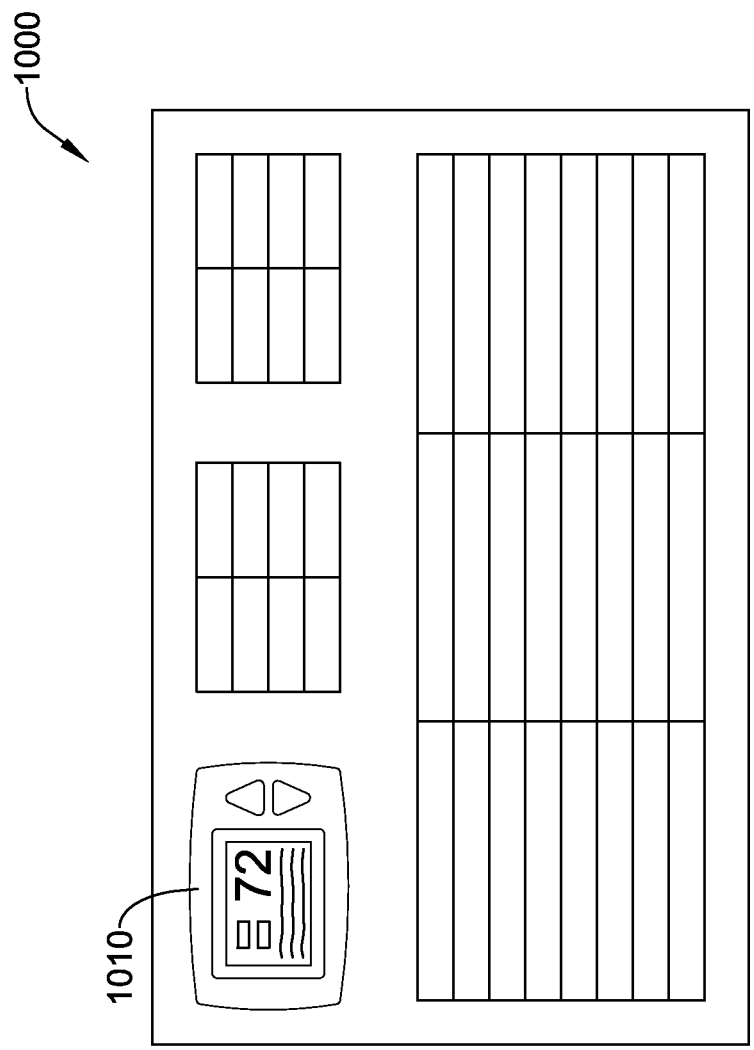
FIG. 10 is a schematic illustration of a window air conditioner having a user interface for an HVAC controller that controls the air conditioner.

The HVAC controller may be any suitable controller. In some illustrative embodiments, it may be a thermostat located remotely relative to the HVAC unit. In some illustrative embodiments, an HVAC controller including a user interface may be incorporated in the HVAC unit. FIG. 10 is a schematic illustration of a window air conditioner 1000 having a user interface 1010 for an HVAC controller that controls the air conditioner.

The disclosure should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

What is claimed is:

1. A wireless HVAC control system configured to command an HVAC unit, the HVAC unit having a heating mode and a cooling mode for modifying an air temperature of an inside space, the HVAC unit having an onboard HVAC unit thermostatic controller, the onboard HVAC unit thermostatic controller configured to accept external selection of a control mode including a cooling control mode and a heating control mode, external input of an onboard setpoint, and external override of a current control temperature, the wireless HVAC control system including a wireless thermostat, the wireless thermostat comprising:
    a memory for storing operational parameters of the wireless thermostat including setpoints that include at least a cooling setpoint and a heating setpoint;
    a user interface configured to allow a user to modify the operational parameters of the wireless thermostat;
    a transmitter configured to transmit commands wirelessly to the HVAC unit;
    a temperature sensor disposed to measure the air temperature; and
    a controller operatively coupled to the memory, the user interface, the transmitter and the temperature sensor;
    wherein the controller is programmed to:
        determine whether modification of the air temperature is desired by comparing the air temperature measured by the temperature sensor with at least one of the cooling setpoint and the heating setpoint;
        if modification of the air temperature is not desired, wirelessly commanding the onboard HVAC unit thermostatic controller, via the transmitter, to prevent modification of the air temperature by the HVAC unit; and
        if modification of the air temperature is desired, wirelessly commanding via the transmitter to the onboard HVAC unit thermostatic controller to:
            externally select the control mode; and
            externally input the onboard setpoint and/or externally override the current control temperature with values effective to cause the HVAC unit to cool or heat, according to the desire for modification of the air temperature.

2. The wireless HVAC control system of claim 1, further comprising a equipment interface module configured to communicatively couple to a control port of the HVAC unit, the equipment interface module including a receiver configured to receive wireless commands from the transmitter of the wireless thermostat, the equipment interface module configured to communicate commands to the HVAC unit via the control port, wherein the commands communicated to the HVAC unit via the control port are based upon the wireless commands from the transmitter of the wireless thermostat.

3. The wireless HVAC control system of claim 1,
wherein the operational parameters stored in the memory of the wireless thermostat include a schedule having a plurality of time periods, at least one of the plurality of time periods associated with a time period cooling setpoint and a time period heating setpoint; and
wherein, in the determining step the controller is programmed to perform, the step of comparing the air temperature measured by the temperature sensor with at least one of the cooling setpoint and the heating setpoint includes comparing the air temperature with the time period cooling setpoint and the time period heating setpoint during the at least one of the plurality of time periods, such that:
if the air temperature is higher than the time period cooling setpoint, it is determined that cooling is desired;
if the air temperature is lower than the time period heating setpoint, it is determined that heating is desired; and
if the air temperature is between the time period cooling setpoint and the time period heating setpoint, it is determined that modification of the air temperature is not desired.

4. The wireless HVAC control system of claim 1, wherein the HVAC unit is a mini-split system.

5. A wireless HVAC control system configured to command an HVAC unit, the HVAC unit having a heating mode and a cooling mode for modifying an air temperature of an inside space, the HVAC unit having an onboard HVAC unit thermostatic controller, the onboard HVAC unit thermostatic controller configured to operate in accordance with a single temperature setpoint when in autochanger mode, the onboard HVAC unit thermostatic controller further configured to accept external selection of a control mode including a cooling control mode and a heating control mode, external input of an onboard setpoint, and external override of a current control temperature, the wireless HVAC control system including a wireless thermostat, the wireless thermostat comprising:
a memory for storing operational parameters of the wireless thermostat including setpoints that include at least a cooling setpoint and a heating setpoint;
a user interface configured to allow a user to modify the operational parameters of the wireless thermostat;
a transmitter configured to transmit commands wirelessly to the HVAC unit;
a temperature sensor disposed to measure the air temperature; and
a controller operatively coupled to the memory, the user interface, the transmitter and the temperature sensor;
wherein the controller is programmed to:
determine whether modification of the air temperature is desired by comparing the air temperature measured by the temperature sensor with at least one of the cooling setpoint and the heating setpoint;
if modification of the air temperature is not desired, wirelessly commanding the onboard HVAC unit thermostatic controller, via the transmitter, to prevent modification of the air temperature by the HVAC unit; and
if modification of the air temperature is desired, wirelessly commanding via the transmitter to the onboard HVAC unit thermostatic controller to:
externally select the control mode; and
externally input the onboard setpoint and/or externally override the current control temperature with values effective to cause the HVAC unit to cool or heat, according to the desire for modification of the air temperature.

6. The wireless HVAC control system of claim 5, further comprising a equipment interface module configured to communicatively couple to a control port of the HVAC unit, the equipment interface module including a receiver configured to receive wireless commands from the transmitter of the wireless thermostat, the equipment interface module configured to communicate commands to the HVAC unit via the control port, wherein the commands communicated to the HVAC unit via the control port are based upon the wireless commands from the transmitter of the wireless thermostat.

7. The wireless HVAC control system of claim 5,
wherein the operational parameters stored in the memory of the wireless thermostat include a schedule having a plurality of time periods, at least one of the plurality of time periods associated with a time period cooling setpoint and a time period heating setpoint; and
wherein, in the determining step the controller is programmed to perform, the step of comparing the air temperature measured by the temperature sensor with at least one of the cooling setpoint and the heating setpoint includes comparing the air temperature with the time period cooling setpoint and the time period heating setpoint during the at least one of the plurality of time periods, such that:
if the air temperature is higher than the time period cooling setpoint, it is determined that cooling is desired;
if the air temperature is lower than the time period heating setpoint, it is determined that heating is desired; and
if the air temperature is between the time period cooling setpoint and the time period heating setpoint, it is determined that modification of the air temperature is not desired.

8. The wireless HVAC control system of claim 5, wherein the HVAC unit is a mini-split system.

\* \* \* \* \*